March 1, 1955 P. H. HUGHES 2,703,227
MATERIAL PICKUP AND HANDLING VEHICLE
Filed Feb. 29, 1952 5 Sheets-Sheet 1

Inventor
PHILIP H. HUGHES
By Malvin White
Attorney

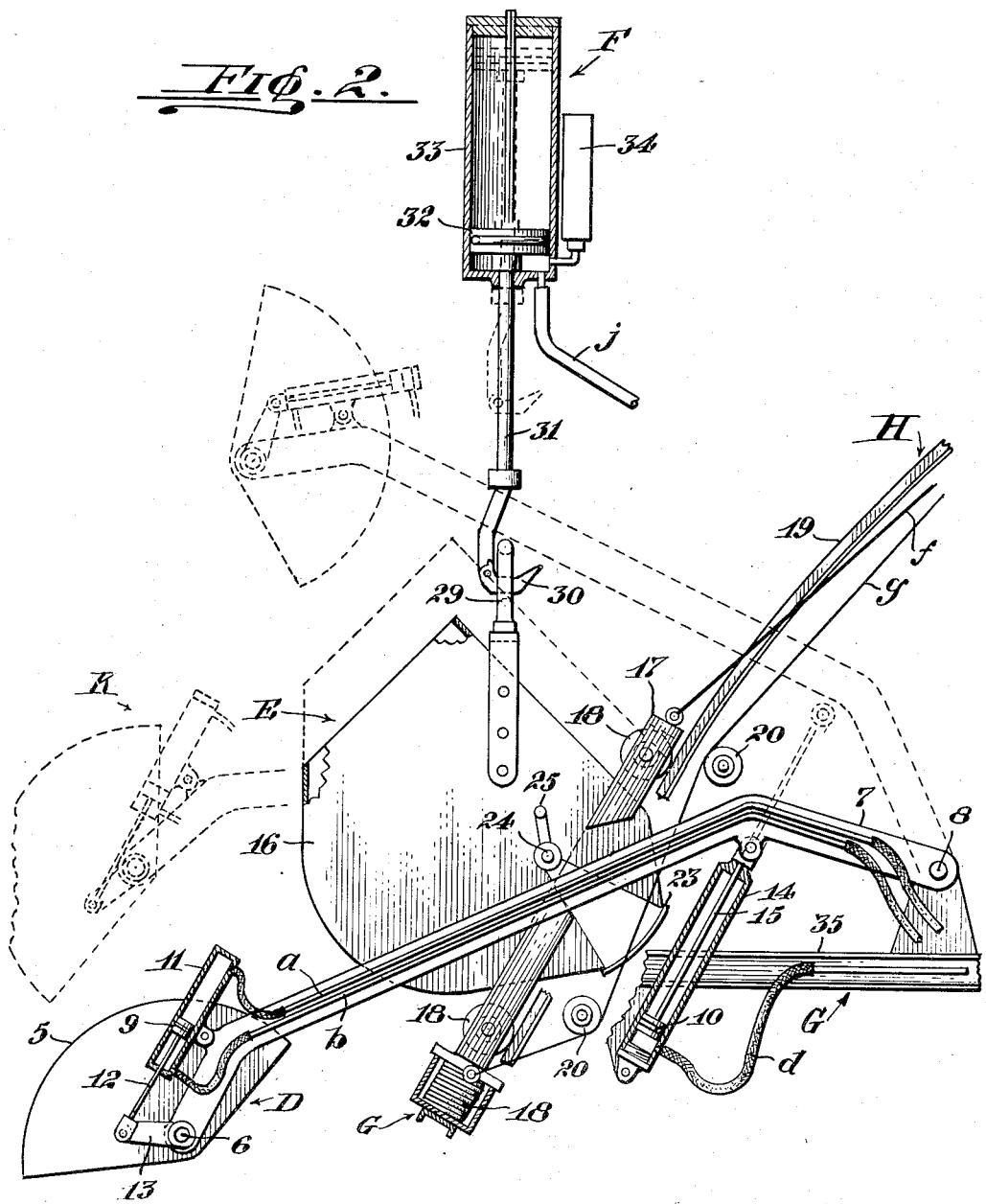

March 1, 1955 P. H. HUGHES 2,703,227
MATERIAL PICKUP AND HANDLING VEHICLE
Filed Feb. 29, 1952 5 Sheets-Sheet 3
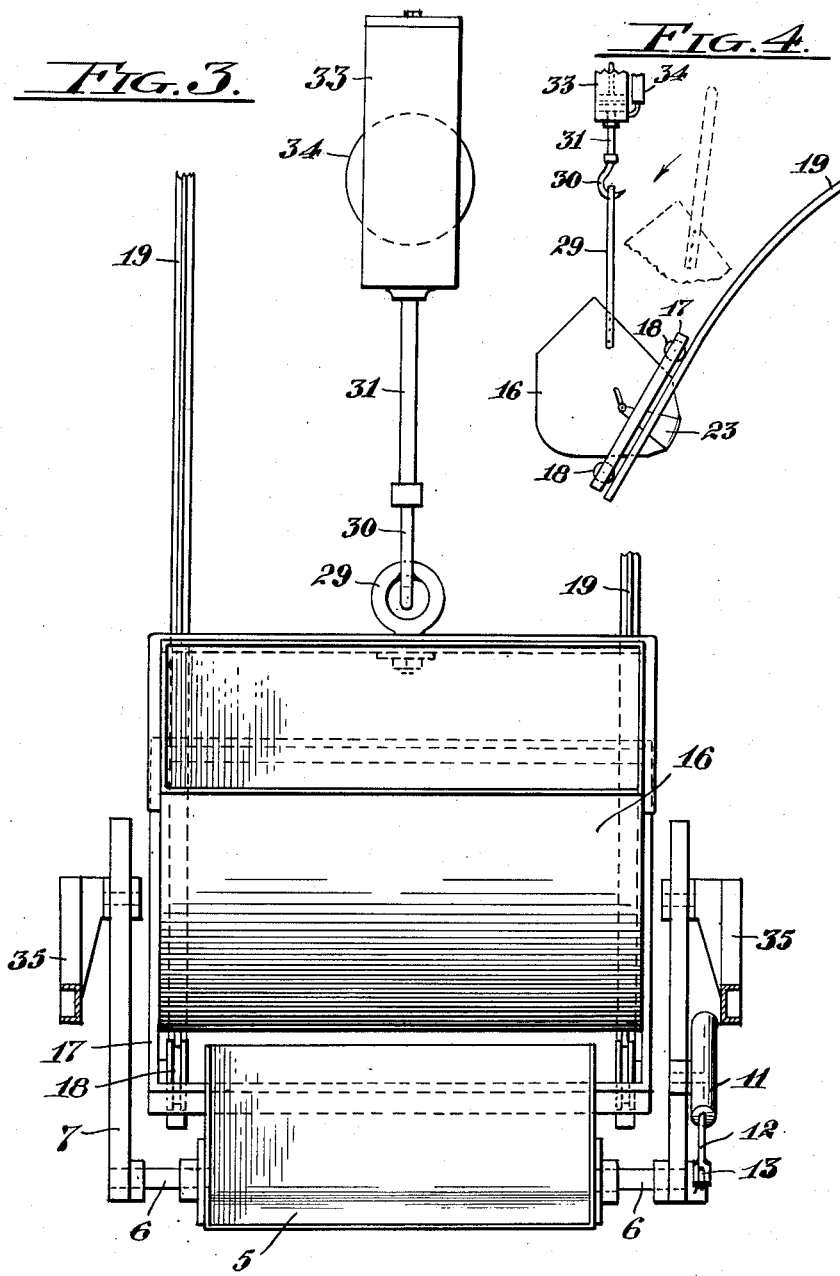
Inventor
PHILIP H. HUGHES
By H Calvin White
Attorney March 1, 1955  P. H. HUGHES  2,703,227
MATERIAL PICKUP AND HANDLING VEHICLE
Filed Feb. 29, 1952  5 Sheets-Sheet 4
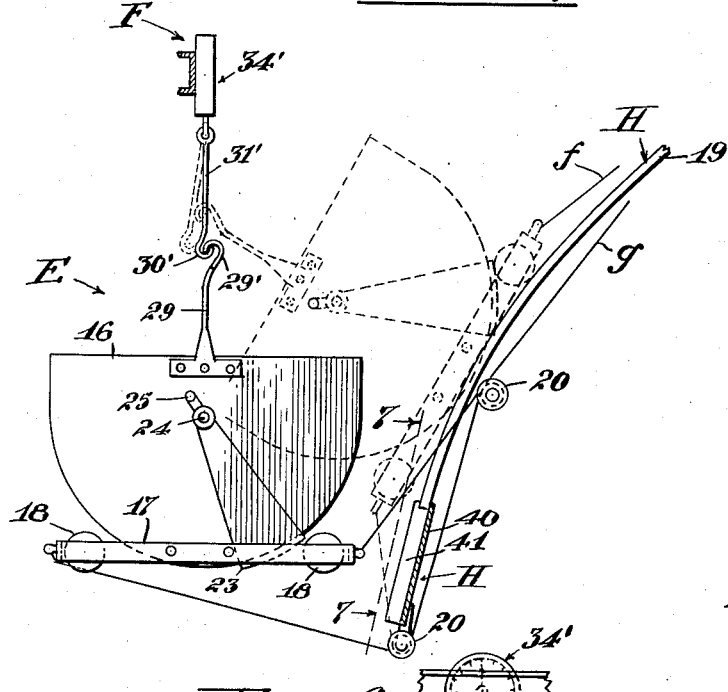
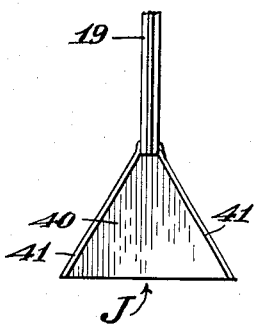
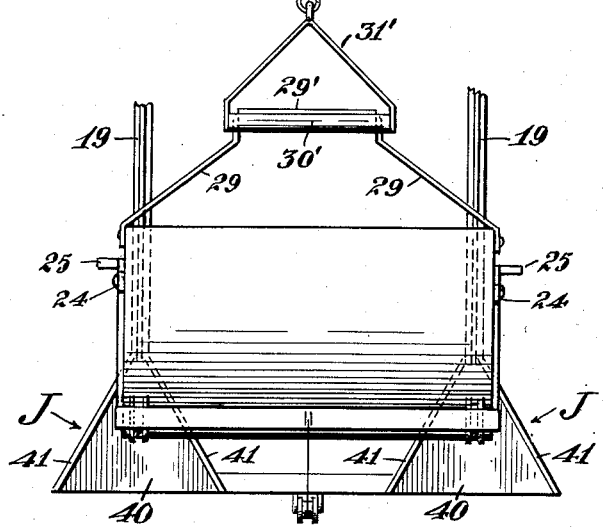
Inventor
PHILIP H. HUGHES
By H. Calvin White
Attorney March 1, 1955 P. H. HUGHES 2,703,227
MATERIAL PICKUP AND HANDLING VEHICLE
Filed Feb. 29, 1952 5 Sheets-Sheet 5

INVENTOR.
PHILIP H. HUGHES
BY Calvin White
ATTORNEY.

United States Patent Office 2,703,227
Patented Mar. 1, 1955

2,703,227

MATERIAL PICKUP AND HANDLING VEHICLE

Philip H. Hughes, Los Angeles, Calif.

Application February 29, 1952, Serial No. 274,206

3 Claims. (Cl. 259—167)

This invention relates to improved material handling vehicles adapted to move to a location near a pile of granular material, scoop up some of the material, measure it out in desired quantities, and feed it to a receiving unit carried by the vehicle. Though it is contemplated that certain features of the invention are broadly applicable to the handling of any of various types of materials, the present vehicles are particularly intended for mixing concrete, and will be described as applied to that use.

In the mixing of concrete, it is extremely important that the cement and aggregate always be mixed in very accurate proportions. To assure such accurate proportioning, it is customary in most construction projects to measure the cement, rock and sand at a central "batching" plant, often located at the yard of the material selling company, and then inject the measured materials into transit mixing trucks, by which the materials are mixed during delivery to the point of use. This procedure however is necessarily very inefficient, since the time of travel for the trucks is usually much longer than the required mixing period for the concrete, and the expensive truck carried mixing equipment therefore cannot be used to maximum advantage. Further inefficiency in a transit mixing process results from the very small load capacity which a transit mix truck can carry as compared with the much larger capacity of a conventional truck of the same weight class. However, in spite of these clear disadvantages of transit mixing, the system is very generally used, since no adequate apparatus has thus far been proposed for efficiently and accurately handling, measuring out in desired quantities, and mixing concrete on the job.

The present invention has for its general object the elimination of many of the inefficiencies in conventional concrete handling, and particularly elimination of the necessity for transit mixing. To achieve this purpose, I have provided a vehicle to be located at the job, and which is adapted by itself to scoop up, measure, and mix the cement, sand and rock, and then deliver the mixed concrete to the particular location at which it is to be poured. Such complete measurement and handling right on the job permits transportation of the materials from the material supply yard to the construction job in conventional relatively large capacity trucks, which may deposit the materials without measurement of any type in individual piles accessible to the pick-up and mixing vehicle.

Structurally, the apparatus of the present invention includes a vehicle, such as a motor truck, adapted to move between a pick-up location adjacent piles of cement, sand, rock or other materials and a discharge location. To the truck is mounted a unit to which the material is to be delivered, preferably including a cement mixer, and mechanism acting to scoop up and deliver the materials to the unit. The material delivering mechanism may comprise a scoop bucket suitably mounted, as by a pair of swinging arms, for movement between a pick-up position in which it is operable to dig into and pick up a portion of a pile of material, and a discharge position for delivering the material in measured quantities to the handling or mixing unit.

Exact measurement of the material is preferably effected by means of scales which act to indicate the weight of material fed by the scoop to the unit. For most accurate measurement, it has been found desirable to employ these scales for supporting a special weighing container, into which the scoop delivers the material, and from which the measured material may be discharged into a mixer. In one form of the invention, this weighing container is mounted stationarily at a location from which it is adapted to discharge directly into the mixer. In a second form of the invention, the container comprises a skip which is movable along the vehicle, typically on a suitable track structure, between a first location for receiving materials from the scoop, and a second location for discharging into the mixer. Certain particular features of this second form of the invention have to do with means for controlling the skip in a manner to automatically discharge its contents upon arrival at the discharge location, and to interengage with the supporting scale at the material receiving location.

In order to permit accurate proportioning of materials fed to the mixer, it is highly important that the operator be able to accurately control the amounts of the various materials fed to the mixer. For this purpose, I so form the scoop or other pick-up mechanism as to be capable of discharging only a controlled portion of its contents to the mixing or handling unit, and to then discharge any excess material back into the pile. More particularly, the scoop bucket may include a portion which is movable relative to the bucket supporting structure or swinging arms to control the material discharge. Preferably, the entire bucket is bodily tiltable in one direction for discharging into a weighing container and in an opposite direction for discharging back into the pile.

The above and other features and objects of the present invention will be better understood from the following detailed description of the typical embodiments illustrated in the accompanying drawings, in which:

Fig. 2 is an enlarged view in side elevation of the forward portion of the pick-up, weighing and conveying mechanism of Fig. 1;

Fig. 3 is a front view, partly broken away, of the structure shown in Fig. 2;

Fig. 4 is a detail in side elevation of a modified form of the weighing mechanism;

Fig. 5 is a view in side elevation with portions broken away of another form of the weighing and conveying mechanism;

Fig. 6 is a view in front elevation of the structure shown in Fig. 5;

Fig. 7 is a detail in section taken on the line 7—7 of Fig. 5 showing one of the track rails as equipped with an end guide for directing the wheels of a skip carriage onto the track after being moved out of engagement and out of alinement therewith.

Figure 1:
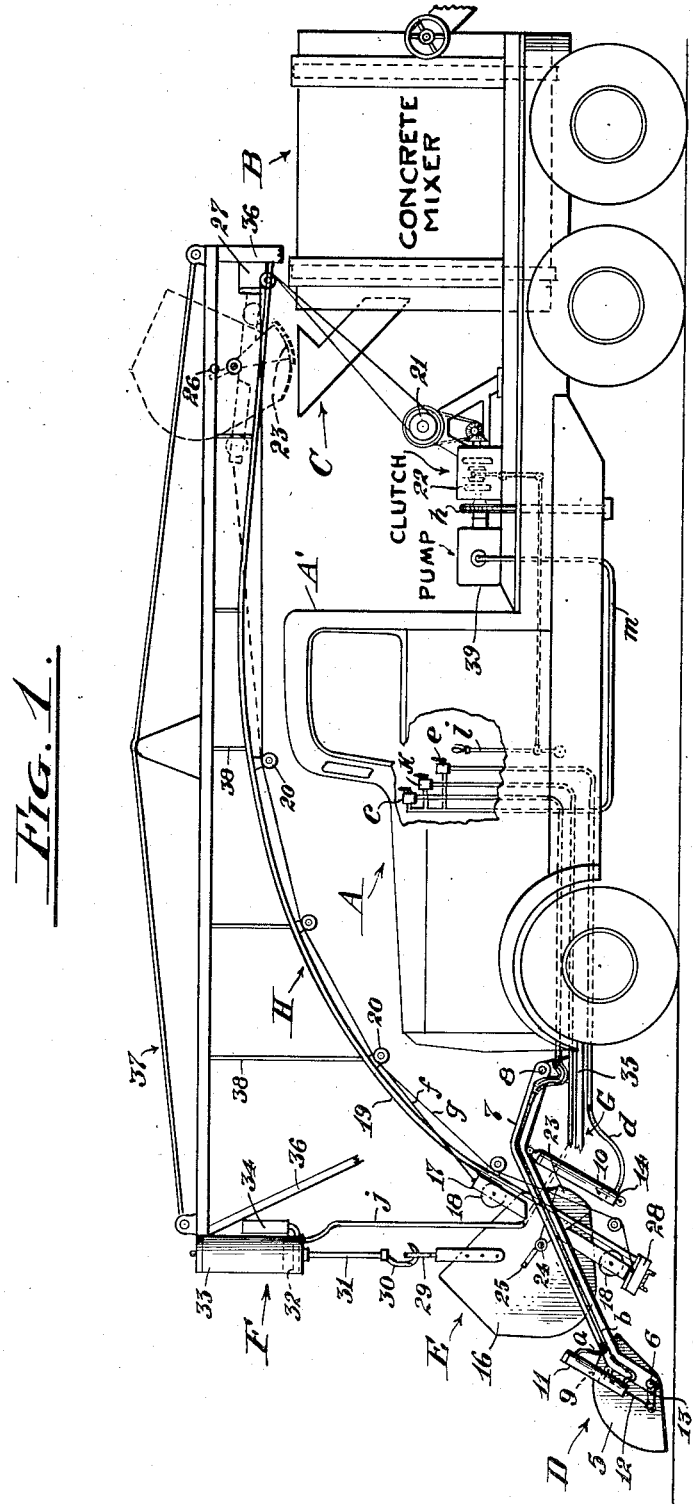
Fig. 1 is a view in side elevation of a first form of concrete handling and mixing unit embodying the invention.

Referring first to Figs. 1-3, A indicates generally a wheeled vehicle typically a motor driven truck, carrying at its rear a conventional rotary concrete mixer B, which mixer contains the usual mixing chamber and has a feed hopper C forming a chute passage directing materials into the mixing chamber.

In carrying out the invention, the vehicle A is fitted at one end thereof, preferably the front end, with a pick-up mechanism D, a conveyor E and a weighing instrumentality F.

The pick-up mechanism D embodies a tiltable scoop or bucket 5 pivoted to swing vertically on trunnions 6 turnably supported on the outer ends of arms 7—7 pivoted at 8 for vertical swinging movement. The scoop 5 as here shown has an obtuse-angled cross section with a front and back edge and is designed to be tilted to present either of its edges in a downward direction. While various means may be employed for tilting the scoop 5 and for swinging the arms 7—7 such means are here shown as embodying hydraulically controlled plungers 9 and 10 respectively; the plunger 9 being mounted in a pivoted cylinder 11 on one of the arms 7 and being fitted with a stem 12 leading to and pivotally connecting with an arm 13 on one of the trunnions 6, and the plunger 10 being mounted in a pivoted cylinder 14 and being fitted with stem 15 leading to and pivotally connecting with one of the arms 7. The arms 7 and cylinder 14 are here shown as mounted on a frame G carried on the vehicle A.

The scoop actuating plunger 9 is double acting under hydraulic pressure applied to either of the ends of the cylinder 11 to move the piston up or down to tilt the scoop 6 in either direction; conduits *a—b* leading from the ends of the cylinder 11 to a control valve *c* in the cab of the vehicle to direct fluid under pressure to the cylinder 11.

The arm actuating plunger 10 is urged in one direction by hydraulic pressure applied to one end of the cylinder 14 so as to elevate the arms 7 and is adapted to be moved in the opposite or downward direction to a normal lowermost position by the load of the arms 7 on relief of pressure from beneath the plunger 10. A conduit *d* leads from the lower end of the cylinder 14 to a control valve *e* in the cab A' of the vehicle for directing fluid pressure to and from the cylinder 14.

The conveyor E embodies a container or skip 16 here shown as fixedly supported on a wheeled carriage 17 fitted with rollers 18 mounted to traverse a track H comprising spaced parallel rails 19—19 leading over the forward end of the vehicle and over the cab thereof and also over the hopper G; the skip 16 being designed and arranged to receive materials from the scoop 5 and being operable to convey and deliver the materials to the hopper C. Movement of the skip 16 along the track H between the ends thereof is here shown as effected by means of cables *f* and *g* which are attached respectively to the front and rear ends of the carriage 17 and lead over rollers 20 to a drum 21 which on being rotated through a clutch 22 will pull the carriage and skip either forward or back according to the direction of rotation of the drum 21 which is controlled by the clutch 22 in conventional fashion. As indicated in Fig. 1 the clutch 22 is driven by a drive mechanism *h* connected to the driving mechanism of the vehicle A in a usual manner and is controlled by a lever *i* in the cab A' in a customary fashion.

The skip 16 is open at its upper end and is fitted on its lower end with a normally closed swinging gate 23 pivoted at 24 on the sides of the skip and fitted with a projection 25 arranged to be engaged and actuated by a fixed abutment 26 as the skip moves to the broken-line discharge position of Fig. 1, to thereby cause the contents of the skip to automatically discharge into the hopper and be delivered to the mixer B. Bumpers 27 and 28 limit the movement of the carriage 17 at its rear and forward positions respectively.

The skip 16 is fitted with a fixed loop or bail 29 which when the skip is in its forwardmost and lowermost position is engageable with a hook 30 incorporated in the weighing instrumentality F, which in the construction shown in Figs. 1 to 4 inclusive is mounted on the lower end of a vertically extending piston rod 31 the upper end of which connects with a plunger 32 in a cylinder 33 and which plunger is adapted to be operated by hydraulic pressure applied therebeneath through a conduit *j* leading to a control valve *k* in the vehicle cab. The plunger 32 operates on upward movement thereof to lift the skip 16 together with the carriage 17 to move the latter clear of the rails 19 so as to suspend the skip from the plunger 32; the cables *f* and *g* being sufficiently slack to permit such upward movement of the skip.

The weighing instrumentality F as shown in Figs. 1 to 4 embracing the plunger 32 and cylinder 33 with their associated parts, also includes a hydraulic scale 34 of conventional construction actuated by hydraulic pressure developed beneath the plunger 32 to weigh the skip and its contents. In effecting connection of the hook 30 and bail 29 either of two arrangements may be employed, one of which as shown in Figs. 2 and 3 resides in first moving the skip 16 to its lowermost position while the hook 30 is in an elevated position and then lowering the hook 30 into snap engagement with the bail 29, and the second of which resides in forming and disposing the bail 29 and hook 30 so that the bail will move into engagement with the hook 30 when the latter is in its lowermost position as shown in Fig. 4, which occurs in moving the skip to its lowermost position. In either event, the bail 29 moves out of engagement with the hook when the skip is advanced on the track H from its lowermost position.

In the constructions shown in Figs. 1 to 4 inclusive, weighing of the skip 16 and its contents is effected by elevating the skip clear of the track H by means of the hydraulically actuated plunger 32. However it is contemplated to dispense with this elevator in some instances and to employ the construction depicted in Figs. 5 and 6, in which the bail 29 of the skip 16 is formed with a forwardly presented hook 29' arranged to move into engagement with a rearwardly presented hook 39' on the lower end of a depending yoke 31' connected to the weighing mechanism of the scale 34'; the hooks 29' and 30' being arranged to interengage as the skip 16 moves downward on the forward end portion of the track H and being adapted to disengage as the skip is moved upward on the forward portion of the track as indicated in dotted lines in Fig. 5.

As a means for insuring alinement of the wheels 18 of the skip carriage with the rails 19 of the track H on moving the carriage toward the track after being suspended from the scales, the lower end of each of the rails 19 is fitted with a guide-way J comprising a flat plate 40 having converging upstanding flanges 41 leading to but slightly spaced from the lower end of the rail 19. The plate 40 is disposed in the path of the wheels 18 as the skip is moved in its suspended position toward the track and the flanges 41 are arranged to direct the wheels 18 onto the ends of the rails 19 as the skip is advanced upwardly onto the track H. The wheels 18 are flanged in a usual fashion so as to be guided on the rails 19 when engaged therewith. The provision of the guide-ways J is important since they serve to aline the wheels 18 with the rails 19 in event the truck A be tilted laterally such as to throw the suspended skip to either side of the track.

As here shown the mechanism embodying the invention is supported on a framework carried by the vehicle A and here shown as including side rails 35 embodied in the frame G projecting from the forward end of the vehicle, on which frame and portions of the vehicle A is erected standards 36 supporting a super-structure 37 from which the rails 19 are suspended by hangers 38. It is manifest however that the mechanism may be disposed in a reverse direction relative to the vehicle, that is to project from the rear end thereof instead of from the forward end.

A source of hydraulic pressure is supplied, being here shown as embodying a pump 39 operated from the drive mechanism *h*, by means of which fluid under pressure is directed through a conduit *m* leading to the control valves *c*, *e* and *k*, from whence the fluid is directed to the several cylinders as according to the manipulation of the control valves by the operator.

Preliminary to the operation of the invention the dry granular materials to be mixed are piled on the ground at a place accessible to the truck A and contiguous the location where the mixed materials are to be used. The several materials in the case of those used in the formation of concrete, consist of a dry cementitious powder, and aggregates comprising sand and gravel or crushed rock; the several materials being piled in separate but contiguous heaps to provide a pile of dry cement, a pile of sand, and a pile of gravel or crushed rock. In some instances, a pile of mixed sand and gravel or rock may be provided.

In the operation of the invention, when it is desired to prepare a batch of concrete, the truck A is positioned in front of and adjacent to the piles of dry materials, and the pick-up mechanism D, conveyor E and weighing instrumentality F are positioned relative to each other as shown in full lines in Figs. 1, 2, 4, and 5, that is, with the scoop carrying arms 7 in their lowered position, the scoop 5 in its intermediate scooping position and the skip 16 engaged with the weighing instrumentality. The truck A is then moved to advance the scoop 5 into a selected pile of the materials in a fashion to load the scoop, and the skip 16 is disposed in a dependent position from the weighing instrumentality F clear of the track H as by directing fluid pressure beneath the plunger 32 in the case of the construction shown in Figs. 2 and 4, or by suspending the skip directly from the scales 34' in the construction shown in Fig. 5. The skip 16 will then be disposed adjacent the lower end of the track H in spaced relation thereto and will be positioned between the arms 7—7 a short distance rearward and above the scoop 5. The arms 7—7 carrying the loaded scoop are then elevated by delivery of fluid under pressure to the cylinder 14 beneath the piston 10 so as to cause the latter to move upwardly in the cylinder and thereby lift the arms 7—7 which are thus moved to a position wherein the scoop 5 will be disposed above the suspended skip 16. The scoop 5 is then tilted rearwardly as indicated in dotted lines in Fig. 2 so as to spill its contents or a portion thereof into the skip; the scoop being thus tilted to the desired extent by delivering fluid under pressure to the cylinder 11 beneath the piston 9.

By controlling the tilt of the scoop by watching the scale 34 or 34' the operator may determine the weight of the material delivered to the skip or effect the delivery to the skip of a predetermined measured quantity of the materials and which may involve repeated operations of the scoop. After thus delivering the required amount of material to the skip 16, the scoop 5 is restored to its normal intermediate position by directing fluid under pressure above the piston 9 in the cylinder 11 and the arms 7—7 lowered by exhausting fluid pressure from beneath the piston 10 so that the arms 7—7 will gravitate to their lowermost position.

In event the scoop may still contain a portion of the materials, such as occurs when the scoop is elevated carrying a quantity of the material exceeding that necessary to supply the desired weight of the material in the skip and which excess material is retained in the scoop when it is tilted to its normal position after a dumping operation, the scoop is tilted forwardly as the arms 7—7 moved downwardly as indicated at K in Fig. 2 so as to dump the excess material back onto the pile from which it was removed. In this fashion a measured quantity of one or more of the several materials may be delivered to the skip 16; the truck A being moved as occasion requires to direct the scoop 5 into any of the predisposed piles of the material.

After thus loading the skip 16 it is hauled by the cable f onto the track H, moved out of engagement with the weighing instrumentality F, and advanced on the track H to a position over the hopper C where the gate 23 is opened by the projection 25 thereon striking the fixed abutment 26 so as to discharge the contents of the skip into the hopper from whence the materials pass to the concrete mixer B and are mixed with water in the latter and discharged therefrom in the form of concrete in the usual manner.

After emptying the skip it is pulled backward on the track H by the cable g until it starts to gravitate down the inclined portion of the track H where the cable f takes up the load of the skip and whereupon the cable f is fed from the drum 21 under the control of the operator to lower the skip to its initial or starting position in readiness to receive another batch of the materials.

An important feature of the invention resides in the fact that while the skip 16 is being operated to deliver its load to the mixer and to return to its loading position, the scoop 5 may be operated as above described to pick-up a load of materials and may be elevated to its dumping position by the arms 7—7 and readied to spill its contents into the skip 16 the moment it reaches its loading position, which feature contributes to rapid operation and consequent enhanced capacity.

Manifestly the operations of the mechanisms as above described are controlled by an operator in the cab A' who controls movement of the truck A in the usual manner through its power plant, and driving mechanism from which the drive of the clutch 22 and the pump 39 is effected, and who controls operation of the hydraulically actuated elements by the valves c, e and k, and also controls operation of the drum 21 through the clutch 22 by operation of the clutch control lever i.

Figure 8:
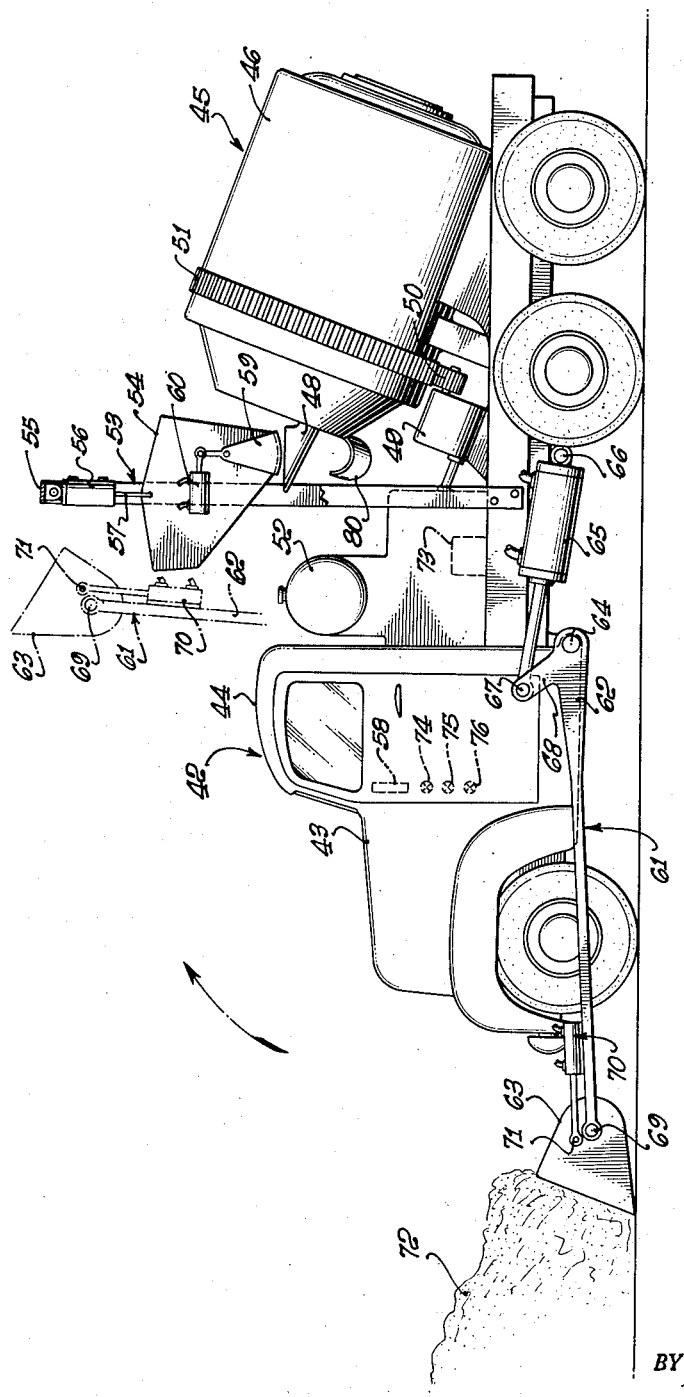
Fig. 8 is a side view of a further variational form of the invention.

Fig. 8 represents a further variational form of the invention, in which the weighing container, instead of being bodily movable between a pick-up and a discharge position, is permanently located in the position from which it discharges into the mixer. As in the previous forms of the invention, the Fig. 8 unit includes an essentially conventional motor truck 42, driven by an engine located beneath its hood 43, and having the usual driver's cab 44. To the rear of truck 42 is mounted a cement mixer 45 including a forwardly inclined rotatable mixing drum 46 containing an inner mixing chamber into which cement and aggregate are fed through the forward open end 47 of the drum. For directing the materials into the drum, the mixer includes a tubular chute or hopper 48 leading into the forward open end 47 of the drum.

The mixing drum is rotatively driven by a motor 49 through a motor driven gear 50 engaging and acting against a ring gear 51 extending about the drum. Water is supplied to the mixing drum from the usual water supply tank 52, which may be mounted forwardly of the mixing drum as shown.

At the forward end of the mixer, the truck carries an upstanding frame structure 53 mounting the weighing container 54 in an elevated position to discharge materials into the mixing drum through chute 48. Frame 53 may typically include a pair of vertically extending supports or columns projecting upwardly from opposite sides of the truck and at opposite sides of the weighing container 54, and carrying between their upper ends a horizontal cross piece 55. To cross piece 55 is pivotally attached a depending hydraulic weighing cylinder 56 of any conventional construction, which in turn supports the weighing container through a bail 57. The cylinder 56 is so constructed that the weight of container 54 and its contents is supported by a hydraulic fluid within the cylinder, the pressure of which fluid is transmitted through a suitable line (not shown) to an indicating dial 58 with the cab, which dial is responsive to the hydraulic pressure to indicate the weight of the weighing container's contents.

Cement, rock, and sand are retained within weighing container 54 during a weighing operation, and are then discharged through a bottom opening in the container into chute 48 and the mixer. The bottom opening of weighing conainer 54 is closed during a weighing operation by a trap door 59, which is power actuable in both its opening and closing directions by a double acting hydraulic actuating cylinder 60.

The concrete forming materials are fed to weighing container 54 by a scoop mechanism 61, which includes a pair of swinging arms 62 projecting forwardly at opposite sides of the truck, and carrying at their forward ends a pick-up or scoop bucket 63. Arms 62 are pivotally mounted to the truck frame at 64 for vertical and rearward swinging movement between their full-line pick-up positions of Fig. 8 and their broken-line discharging positions.

The arms are power actuated in opposite directions between these positions by a pair of double acting hydraulic actuating piston and cylinder mechanisms 65, the cylinders of which are pivoted to the truck at 66, and the piston rods of which are pivoted at 67 to lugs 68 projecting from the scoop arms.

Scoop bucket 63 is pivoted to arms 62 at 69 for swinging or tilting movement in opposite directions. The scoop bucket is power actuated in those opposite directions by a double acting hydraulic piston and cylinder mechanism 70, the cylinder of which is fastened to one of the arms 62, and the piston of which is pivoted at 71 to the scoop bucket. The range of actuation of scoop bucket 63 by piston and cylinder mechanism 70 is such as to permit the clockwise pivotal actuation of the scoop bucket in its broken-line position to a position acting to dump the contents of the scoop out of the rear of the scoop and into weighing bucket 54. Also the range of actuation of bucket 63 is such that in a forward position of the scoop elevated slightly above the full-line pick-up position, the scoop is pivotally actuable in a counterclockwise direction to a condition for dumping any materials within the bucket from the forward side of the bucket and back into the pile of material 72.

The various hydraulic piston and cylinder mechanisms 60, 65 and 70 are actuated by pressure fluid delivered from any suitable source, as for instance from a pump 73 driven in any suitable manner by the engine of the truck. Delivery of actuating pressure fluid to the piston and cylinder mechanisms is controlled respectively by three valves 74, 75 and 76, located within cab 44, and connected into the pressure fluid lines leading from the pump to the cylinders (fluid lines not shown).

In using the Fig. 8 unit, an operator first actuates the control valves for moving the scoop mechanism 61 to its full-line pick-up position. The truck is then driven forwardly toward a pile of granular material 72 which may typically be cement, rock or sand. After the scoop bucket 63 has been advanced into the pile of material to an extent filling the bucket with material, the advancement of the truck is stopped, and hydraulic fluid is admitted to piston and cylinder mechanism 65 for actuating the scoop mechanism to its broken-line discharging position. With trap door 59 of the weighing mechanism closed, pressure fluid is then admitted slowly to the upper end of the cylinder of piston and cylinder mechanism 70, to slowly swing scoop bucket 63 in a clockwise direction as seen in Fig. 8 and thus gradually dump the material from the scoop into weighing container 54.

As the material is thus dumped into the weighing container, the operator watches dial 58 of the weighing scale unit 56, 58, and when the dial indicates that a desired weight of material has been fed into the weighing container, piston and cylinder mechanism 70 is actuated in a reverse direction for stopping the dumping operation and returning the bucket to its original essentially upright condition. The scoop mechanism is then lowered to a position elevated just slightly above the full-line position of Fig. 8, and piston and cylinder mechanism 70 is then actuated for tilting scoop bucket 63 forwardly to dump any excess material from the bucket and back into pile 72. The truck is then backed away from the pile 72 and driven toward a second pile of a different material, the entire operation then being repeated to dump a desired amount of the second material into weighing container 54. After cement, sand and rock have been delivered to weighing container 54 in this manner in proper proportions, piston and cylinder mechanism 60 may be actuated for opening trap door 59 and dumping the properly proportioned batch into the mixer 45. When the batch has been thoroughly mixed, it is discharged from the mixer in conventional manner along the usual laterally extending discharge chute 80.

I claim:

1. Apparatus comprising a motor vehicle movable along a surface to a location near a pile of material, a concrete mixer carried by said vehicle to which said material is to be supplied, a container carried by the vehicle and movable relative thereto between a first position for receiving a quantity of said material and a second position for discharging the material into said concrete mixer, track means on the vehicle guiding said container for said movement, means for actuating said container between said positions, means carried by the vehicle operable to displace some of said material from the pile into said container in said first position, scales carried by the vehicle, said scales and container having parts movable into interfitting engagement in said first position of the container to support the container from the scales and thereby indicate the weight of the material displaced into the container, one of said parts being movable relative to the other when said container is in said first position to elevate the container from said track means, and means for actuating said one part relative to the other to effect said container elevation.

2. Apparatus comprising a motor vehicle movable along a surface to a location near a pile of material, concrete handling and mixing apparatus carried by the vehicle and to which said material is to be fed, a scoop carried by the vehicle operable to displace material from said pile to said handling and mixing apparatus, mounting arm means mounting said scoop to the vehicle for bodily swinging movement between a pick-up position in which it is operable to dig into and pick up material from said pile and a discharge position in which it feeds some of the material to said handling and mixing apparatus, scales carried by the vehicle operable to indicate the weight of the material fed from said scoop to said handling and mixing apparatus, means mounting said scoop to said arm means for swinging movement relative thereto to a position for pouring excess material from the scoop back into said pile, and means for effecting said swinging movement of the scoop relative to the arm means.

3. A concrete mixing unit comprising a motor truck having a driver's cab, a concrete mixer mounted on the truck to the rear of said cab, a pair of tracks extending from a location in front of said cab upwardly and rearwardly over the cab to the location of said concrete mixer, a skip movable along said tracks between a material pick-up position in front of the cab and a rear position near the mixer, a scoop bucket mounted at the forward end of the truck for swinging movement between a forward and lowered position in which it is operable to pick up materials from a pile thereof and a rearward and elevated position in which it discharges the material into said skip, swinging arms mounting said scoop bucket to the vehicle for said swinging movement, means for actuating said arms to move the bucket between said positions, means mounting the bucket to said arms for swinging movement in opposite direction relative thereto to dump material therefrom into said skip and pile respectively, means for actuating said bucket in said opposite directions relative to the arms, scales supporting the skip in said pick-up position and indicating the weight of said material displaced thereinto, and means for moving said skip between said positions, said skip being operable in said rear position to discharge said material into the mixer, said skip having a movable bottom wall adapted to open for discharging the skip contents into said mixer, and said unit including parts on said skip and vehicle acting to interengage and open said skip wall as the skip reaches said rear position, said scales and skip having parts movable into interfitting engagement in said pick-up position of the skip to support the skip from the scales.

References Cited in the file of this patent

UNITED STATES PATENTS

| | | |
|---|---|---|
| 1,295,849 | Carr | Mar. 4, 1919 |
| 1,686,053 | Wheatley | Oct. 2, 1928 |
| 1,943,398 | Sargent | Jan. 16, 1934 |
| 2,271,434 | Johnson | Jan. 27, 1942 |
| 2,310,592 | Noble | Feb. 9, 1943 |
| 2,427,968 | Hoover | Sept. 23, 1947 |
| 2,565,792 | Wagner et al. | Aug. 28, 1951 |
| 2,571,113 | Crosby | Oct. 16, 1951 |
| 2,591,785 | Crawford et al. | Apr. 8, 1952 |